United States Patent Office 3,223,428
Patented Dec. 14, 1965

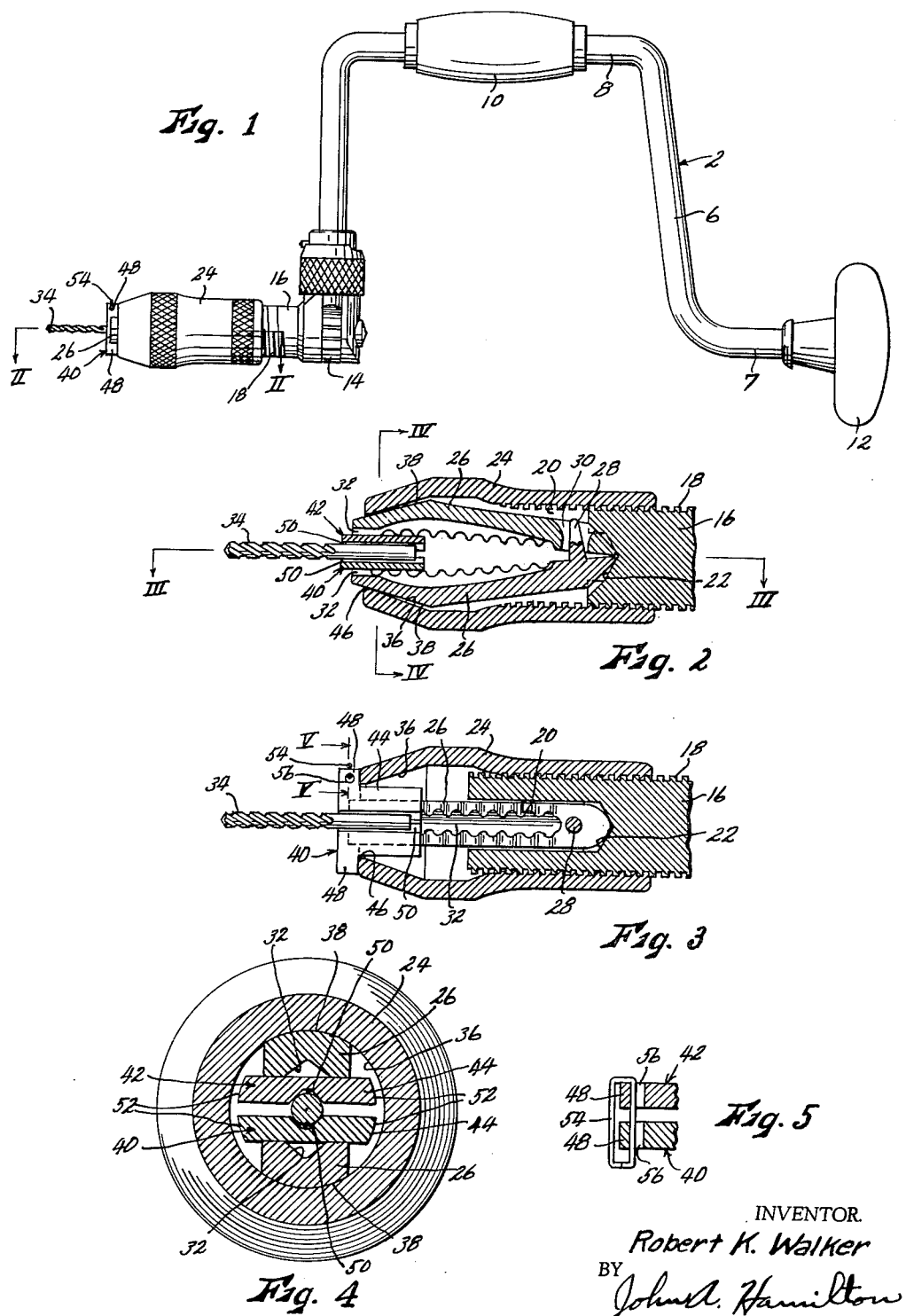

3,223,428
AUXILIARY JAWS FOR CHUCK TOOLS
Robert K. Walker, P.O. Box 5194, Tulsa, Okla.
Filed Oct. 10, 1963, Ser. No. 315,286
5 Claims. (Cl. 279—36)

This invention relates to new and useful improvements in chuck tools, and has particular reference to a set of auxiliary jaws adapted to be mounted in and operated by the usual jaws of the tool chuck, such as the jaws of an ordinary drill brace, and themselves to grip a drill or other object.

Important objects of the present invention are the provision of auxiliary jaws of the character described which will adapt the tool to the use of drills or other objects of different diameters, particularly smaller, than those which the tool was originally adapted to grip, which will permit continued use of braces or other tools the usual jaws of which have become inoperative due to wear or deformation, and which provide automatically for centering of the object gripped thereby on the axis of the chuck.

Other objects are simplicity and economy of construction, and efficiency and dependability of operation. With these objects in view, as well as other objects which will appear in the course of the specification, reference will be had to the accompanying drawing, wherein:

FIG. 1 is a side elevational view of an ordinary drill brace equipped with auxiliary jaws according to the present invention, FIG. 2 is an enlarged fragmentary sectional view taken on line II—II of FIG. 1, FIG. 3 is a sectional view taken on line III—III of FIG. 2, FIG. 4 is an enlarged sectional view taken on line IV—IV of FIG. 2, and FIG. 5 is an enlarged fragmentary sectional view taken on line V—V of FIG. 3.

Like reference numerals apply to similar parts throughout the several views, and the numeral 2 applies generally to an ordinary drill brace which, as shown in FIG. 1, consists of a heavy rod stock frame 6 having an axial portion 7 and a parallel but eccentrically offset portion 8 on which a handle 10 is rotatably mounted. A steady handle 12 is mounted at the free end of portion 7 for rotation coaxially thereon. Mounted at the opposite end of the frame so as to be coaxial with portion 7, by means of a ratchet mechanism 14 forming no part of the present invention, is a cylindrical drill chuck body 16. Said body is externally threaded as indicated at 18, and the outer end portion thereof is diametrically slotted as at 20 (see FIGS. 2 and 3). An axially opening socket 22 is formed at the inner end of slot 20. An internally threaded chuck barrel 24 is threaded on body 16, and extends outwardly therefrom. A pair of elongated "alligator" jaws 26 are disposed in slot 20 and extend forwardly through the forward end of barrel 24. Said jaws rest pivotally at their rearward ends in socket 22, whereby their forward ends may be pivoted toward and away from each other. The jaws are maintained in substantial longitudinal alignment by a pin 28 formed on one of the jaws adjacent its inner end and projecting transversely therefrom through a hole 30 formed in the other jaw. The adjacent faces of the jaws each have a longitudinal V-groove 32 formed therein which, in normal use, are adapted to cooperatively grip the shank portion of a drill bit 34 placed therebetween. The jaws are forced together, whereby to grip the drill bit, by advancing barrel 24 rearwardly on body 16, whereupon the internally conical forward portion 36 of the barrel, which tapers forwardly, engages the correspondingly shaped distal faces 38 of the jaws and urges said jaws closer together to grip the drill.

The structure thus far described is common, but it often happens that the grooves 52 of jaws 26 become so battered, misshapen and enlarged from hard usage that said jaws are no longer capable of holding a drill bit tightly or efficiently. In the past, this has generally caused discard of the whole brace, since replacement of the jaws only is often not possible due to lack of availability. This of course represents a real financial loss, while the entire brace, other than the jaws, may be in perfectly usable condition. Also, jaws 26 are usually of such size that only drill bits of greater than a certain minimum diameter may be gripped therein, while it is often desired to use still smaller bits. With careful handling of the brace, it is also quite practical to use such a smaller bit.

Accordingly, the present invention contemplates the use of a pair of auxiliary jaws 40 and 42 each consisting of a substantially planar plate of steel or the like, said jaws being adapted to be gripped between jaws 26. As best shown in FIG. 3, each of jaws 40 and 42 is substantially T-shaped, having a straight shank portion 44 adapted to be inserted into the forward end opening 46 of barrel 24, and a laterally projecting ear 48 at each side of the forward end thereof. The adjacent faces of said jaws each have a substantially V-shaped groove 50 extending longitudinally the full length thereof and disposed centrally between the lateral edges thereof. The confronting grooves 50 are adapted to receive and grip a drill bit 34 therebetween, as shown in the drawing, the jaws 40 and 42 being urged together by jaws 26 which are urged by barrel 24 as above.

Use of the auxiliary jaws is believed clear and obvious. The shank portions 44 of said jaws are wider than jaws 26 and are therefore gripped by the faces of jaws 26, rather than in the bit grooves 32 thereof. Therefore the efficient gripping of the auxiliary jaws is not affected by wear or deformation of grooves 32. Shank portions 44 of the auxiliary jaws are of such transverse width as to fit closely in the forward opening 46 of barrel 24. This prevents any appreciable lateral movement of the auxiliary jaws, and thus keeps drill bit 34 centered axially of the chuck. The lateral edges of shanks 44 may be rounded as indicated at 52 in FIG. 4 to better conform to the shape of opening 46. Ears 48 engage the forward end of barrel 24, which is of course at right angles to the chuck axis, and thereby preventing the auxiliary jaws from canting in their own plane and thereby prevent grooves 50 from tilting out of axial alignment with the chuck. Said ears also prevent the auxiliary jaws from dropping into the interior of the barrel. Grooves 32 of main jaws 26 provide that pressure is exerted by said jaws on the auxiliary jaws only along two lines at opposite sides of a plane containing drill bit 34 and disposed normally to the planes of the auxiliary jaws. This defeats any tendency of the auxiliary jaws, under pressure, to flex along the root of its groove 50, which would tend to open or "spread" the groove. Such flexing, which could occur if jaws 26 exerted pressure along the midlines of the auxiliary jaws and if the operative faces of jaws 26 were slightly irregular, would loosen the gripping force on the drill bit.

It is contemplated that jaws 40–42 would be supplied in sets wherein the grooves 50 are of various depths, whereby to permit the use thereof with drill bits 34 of many different sizes. Said jaws are of course small, and different sets could easily be mixed and confused in a tool box or tool drawer. To prevent this occurrence, the jaws 40–42 of each set are connected by a loose wire link 54 extending through matching holes 56 formed in one of the ears 48 thereof, as best shown in FIG. 5. Said link will permit all normally required relative movement of the connected jaws, but will prevent them from being intermixed with other sets.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. In combination with a drill chuck including a tubular barrel and a pair of main jaws disposed in said barrel and extending through the open forward end thereof, said main jaws being operable by movement of said barrel to clamp a drill bit between the adjacent faces thereof, auxiliary jaws comprising:
   (a) a pair of generally planar plates each having an elongated shank portion adapted to be inserted into the forward end opening of said barrel between said main jaws, the adjacent faces of said plates each having a groove formed longitudinally therein, whereby a drill bit may be inserted into said grooves of said plates and gripped therebetween.

2. The structure as recited in claim 1 wherein the groove of each of said plates is parallel to and midway between the longitudinal edges of the shank portion of the plate, and wherein the transverse width of said shank portion is such as to fit closely in the forward end opening of said barrel, whereby said groove is centered with respect to said barrel.

3. The structure as recited in claim 1 wherein the forward end face of said barrel is disposed at right angles to the axis thereof, and wherein each of said plates is provided with a pair of laterally projecting ears adapted to overlap and engage said forward end face of said barrel, the operative edges of said ears being aligned and normal to the axis of the groove of said plate, whereby said groove is maintained parallel to the axis of said barrel.

4. The structure as recited in claim 3 wherein the groove of each of said plates is parallel to and midway between the longitudinal edges of the shank portion thereof, and wherein the transverse width of said shank portion corresponds closely to the diameter of the forward end opening of said barrel, whereby said groove is centered with respect to said barrel.

5. The structure as recited in claim 1 wherein the adjacent faces of said main jaws are of substantial transverse width and are generally planar except for a groove formed longitudinally therein intermediate the edges thereof, wherein the shank portions of said plates have a transverse width at least as great as that of said main jaws, and wherein a plane normal to said plate and containing the axis of the groove thereof will also contain the axes of the grooves of said main jaws.

References Cited by the Examiner
UNITED STATES PATENTS

| | | | |
|---|---|---|---|
| 405,522 | 6/1889 | Bartholomew | 279—36 |
| 2,242,080 | 5/1941 | Kurzina | 269—270 |
| 2,729,129 | 1/1956 | Reese | 269—268 |
| 2,838,971 | 6/1958 | Shekter | 269—268 |

ROBERT C. RIORDON, *Primary Examiner.*